Aug. 19, 1958  G. F. HAUSMANN  2,847,822
THRUST MODIFYING DEVICE
Filed Nov. 1, 1954  2 Sheets-Sheet 1

INVENTOR
GEORGE F. HAUSMANN
BY *Leonard F. Welch*
ATTORNEY

Aug. 19, 1958 G. F. HAUSMANN 2,847,822
THRUST MODIFYING DEVICE
Filed Nov. 1, 1954 2 Sheets-Sheet 2

INVENTOR
GEORGE F. HAUSMANN
BY
ATTORNEY

United States Patent Office 2,847,822
Patented Aug. 19, 1958

2,847,822

THRUST MODIFYING DEVICE

George F. Hausmann, Glastonbury, Conn., assignor to United Aircraft Corporation, East Hartford, Conn., a corporation of Delaware Application November 1, 1954, Serial No. 466,070

13 Claims. (Cl. 60—35.54)

This invention relates to jet propulsion devices and more particularly to thrust modifying mechanisms therefor.

It is an object of this invention to provide a thrust modifying or thrust reversing mechanism for jet propulsion devices or power plants.

Another object of this invention is to provide a thrust reversing mechanism which is extremely effective while not adding prohibitive weight to the power plant or aircraft.

These and other objects will become readily apparent from the following detailed description of the drawings in which.

Figure 1:
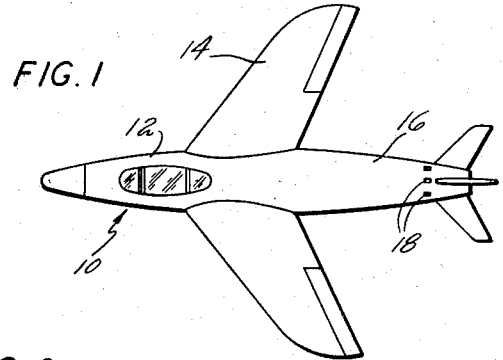
Fig. 1 illustrates an aircraft having the thrust modifying device of this invention.
Figure 2:
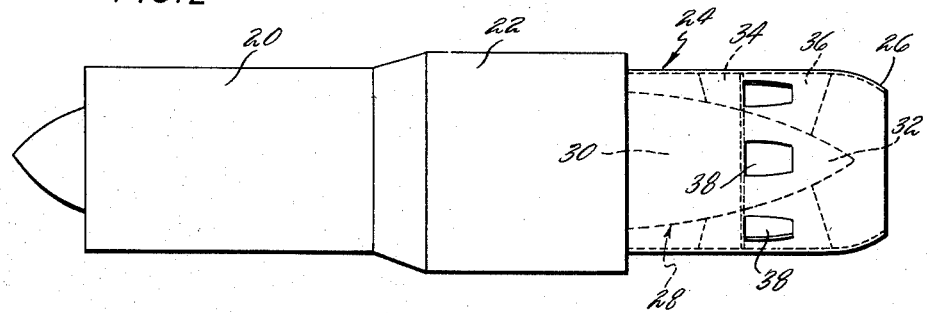
Fig. 2 illustrates a typical power plant utilizing this invention.

Referring to Fig. 1, an aircraft 10 is illustrated as having a fuselage 12 and main sustaining wings 14. The fuselage 10 has an aft or exhaust section 16 which includes a plurality of ports 18. The power plant shown in Fig. 2 is intended to be varied within the fuselage 12 of the aircraft 10. The power plant includes a compressor section 20, a combustion section 22, a tailpipe 24 and an exhaust nozzle 26. The tailpipe 24 houses a tail cone or inner body 28 which is formed by an upstream portion 30 and a downstream portion 32. These portions have connected thereto upstream and downstream fin or strut portions 34 and 36, respectively, which cooperate to guide the exhaust gases passing thereby. The tailpipe 24 includes a plurality of openings 38 which are intended to cooperate with the openings 18 shown in Fig. 1 in a manner to be described hereinafter.

Figure 3:
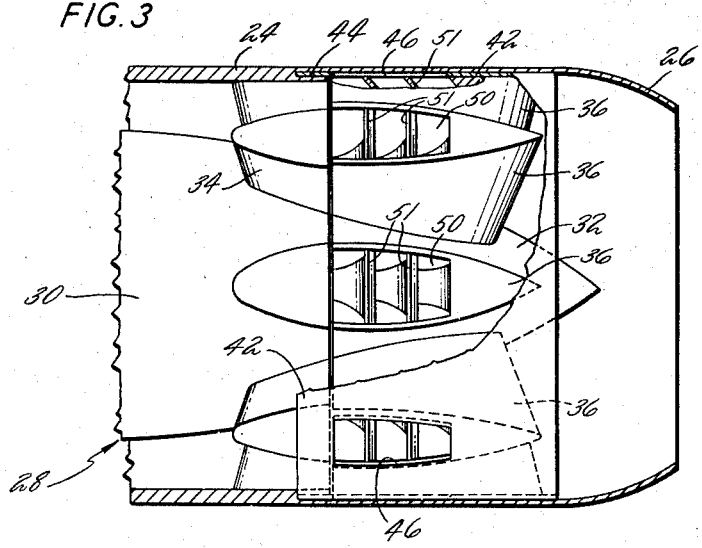
Fig. 3 is an enlarged partial cross-sectional view of the exhaust end of the power plant with the parts in their normal operating position.

Referring to Fig. 3, the exhaust end of the power plant is more clearly illustrated. The portions 34 and 36 are clearly shown herein whereby each of them cooperate to form a streamline body or strut of airfoil shape. The struts are located in a flow area which is substantially larger than the flow area at the turbine so that the flow between the struts is not choked. In the construction shown the struts block approximately 50% of the area at that axial location. As seen in Fig. 3, the aft portions 36 of the struts include a shroud 42 which is suitably connected to the outer ends of the struts and includes an overhang portion 44 on the forward side thereof which fits into a cooperating slot in the wall of the tailpipe 24. This shroud includes a plurality of openings 46 which cooperate with the openings 38 in the wall of the tailpipe 24.

Figure 4:
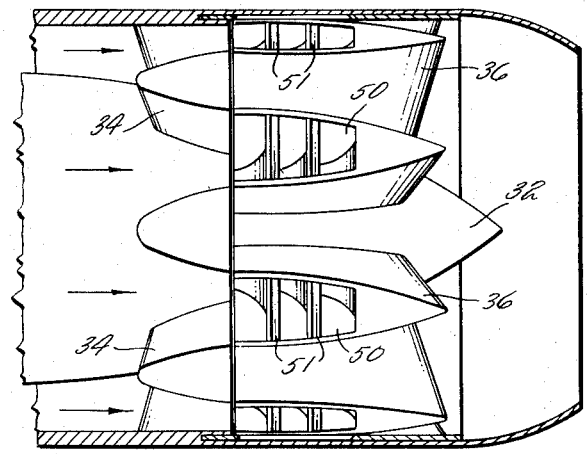
Fig. 4 is similar to Fig. 3 but illustrates the parts in their thrust modifying or thrust reversing position.
Figure 5:
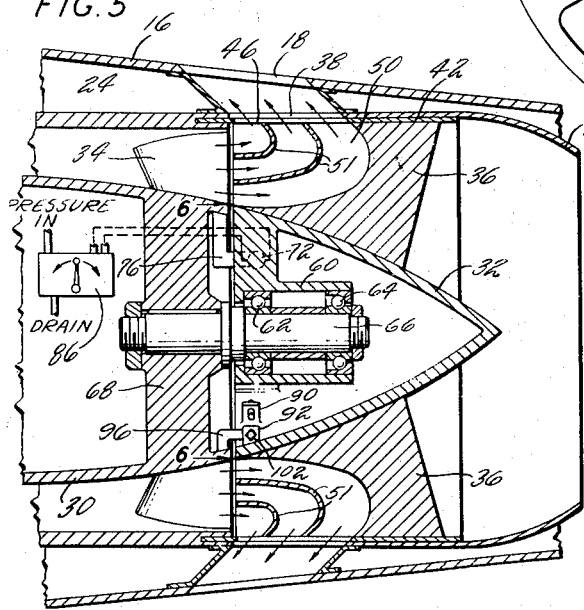
Fig. 5 is an enlarged detail partially in cross section and partially schematic illustrating the tail cone and supporting structure.

The aft portions 36 of the struts include curved passages 50 which are also seen more clearly in Figs. 4 and 5. In the passages 50 there are located a plurality of sheet metal turning vanes 51 which are in the form of a cascade. These passages face forward and form a curved path for fluid flow to be directed radially outwardly and transversely of the axis of the power plant. Thus when the thrust of the power plant is intended to be modified or reversed the aft tail cone portion 32 and the aft portions 36 of the struts are rotated to the position shown in Fig. 4. In this position the aft portions 36 of the struts have their wide leading edges moved to a position such that they intercept the flow passing between the strut portions 34. The flow then is intercepted by the passages 50 and diverted in a radial direction or in a direction transversely of the normal axis of flow so that thrust modification or thrust reversal can be obtained depending upon the amount of curvature of the passages 50 or depending also upon the amount of intercepting blockage provided by the strut aft portions 36. For full thrust reversal the aft portions 36 will be rotated approximately one half the distance between strut centerlines. This may be expressed in degrees as being equal to $$\frac{360°}{\text{No. of struts} \times 2}$$

The flow of gases during thrust modification or reversal is best seen in Fig. 5. In this position of the strut portions the gas flow is being intercepted by the passages 50 and is being diverted radially outwardly through the openings 46 in the shroud 42, the openings 38 in the tailpipe 24 and the openings 18 in the fuselage aft portion 16. It should be noted that the openings 46 in the shroud 42 are so indexed that they will be in communication with openings 38 and 18 when the parts are in the thrust modifying or thrust reversal position but they will be out of alignment when the parts are in their normal operating position. Thus in the normal operating position when the openings are not in registry the shroud 42 will block any flow of fluid outwardly through the openings 38 at 18.

In connection with each of Figs. 2 through 5 it should be noted that the cooperating fin portions are tapered in a radial and chordwise direction so that they have substantially the same airfoil cross sections at all radii and hence the flow blockage is equal at all cylindrical elements along the radii. The chord of each of the fins extends along the axis of fluid flow through the tailpipe. Furthermore, the fins are separable at their thickest chordwise station with the aft portions being movable as previously described.

Figure 6:
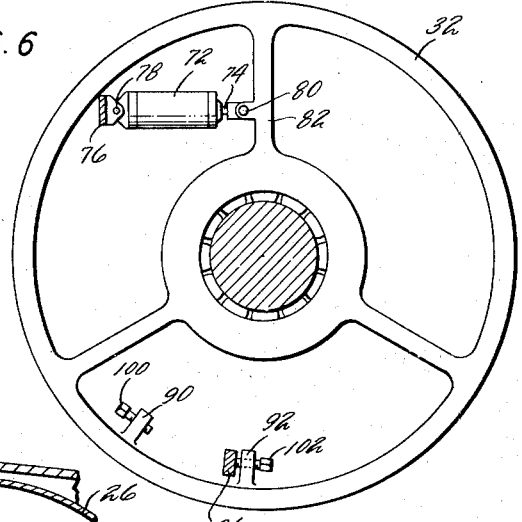
Fig. 6 is a view taken along the line 6—6 of Fig. 5.

Referring again to Fig. 5, the aft tail cone portion 32 is shown as having the strut aft portions 36 and the shroud 42 fixed thereto. The tail cone 32 includes a flange 60 and thrust bearings 62, 64 which are mounted on a shaft 66. The shaft 66 is in turn fixed against rotational movement within a web 68 carried by the stationary tail cone portion 30. Thus the aft tail cone portion 32 including the fin portions 36 are freely rotatable on the shaft 66. As shown both in Figs. 5 and 6, a cylinder-piston combination 72, 74 is operatively connected to both tail cone portions 30, 32. The tail cone portion 30 includes a depending arm 76 which extends inside the tail cone portion 32 and includes a pivot 78 for supporting cylinder 72. The piston portion 74 is pivotally connected at 80 to a web 82 of the tail cone portion 32. Thus by operating the valve 86 (Fig. 5) the cylinder-piston combination 72, 74 can be extended or retracted to thereby rotate the tail cone portion 32 about the shaft 66.

In order to have the openings 46, 38 and 18 properly indexed a pair of stops 90, 92 are provided on the tail cone portion 32. A depending arm 96 extends from the tail cone portion 30 into the hollow tail cone portion 32 and engages the stops 90 and 92 in the two operative positions of the tail cone portion 32. The stops 90, 92 include set screws 100, 102 so that proper adjustment can be made.

As a result of this invention it is readily apparent that a simple, rugged and efficient lightweight mechanism has been provided for controllably modifying or reversing the thrust of a jet propulsion power plant. Furthermore, since there are no high loads imposed on the elements of the mechanism the actuating device and associated parts need not be highly stressed and this reflects in the final weight of the system.

Although only one embodiment of this invention has been illustrated and described herein it will be apparent that various changes and modifications may be made in the construction and arrangement of the various parts without departing from the scope of this novel concept.

What it is desired to obtain by Letters Patent is:

1. In a mechanism for reducing the forward propulsive thrust of a jet power plant, the power plant having an exhaust nozzle, a duct leading to said nozzle and adapted to have a gas stream flowing therethrough, streamlined fins located within the power plant upstream of said nozzle and within said duct, said fins radiating outwardly from the center of said duct and extending to the outer wall thereof, said fins including forward portions which are fixed and rearward portions arranged for simultaneous movement about the axis of said duct, means for moving said rearward portions out of alignment with respect to said forward portions to intercept the rearward flowing gases, and means for diverting said gases transversely of the axis of said duct, including passages in the duct walls which are simultaneously opened and closed upon movement of said rearward portions, said passages being opened when said aft portions are in the flow intercepting position and said passages being closed when said aft portions are in alignment with forward portions of said fins.

2. In a jet propulsion power plant, a combustion chamber, a duct receiving gases from said combustion chamber, a nozzle at the aft end of said duct, a central body within said duct, a plurality of fins mounted radially from said body and extending substantially to the outer wall of said duct, said fins being of airfoil shape and having their chords extending along the duct axis, said fins being separable at a point approximately at their thickest chordwise station to form fore and aft portions, said fore portion being fixed and said aft portions being movable about the duct axis, means for moving said aft portions to intercept at least a portion of the gases passing through said duct, and openings in the duct wall for exhausting the intercepted gas, including means for simultaneously opening and closing said openings upon movement of said aft portions, said openings being opened when said aft portions are in the flow intercepting position and said openings being closed when said aft portions are in alignment with forward portions of said fins.

3. In a jet propulsion power plant, a combustion chamber, a duct receiving gases from said combustion chamber, a nozzle at the aft end of said duct, a central body within said duct, a plurality of fins mounted radially from said body and extending substantially to the outer wall of said duct, said fins being of airfoil shape and having their chords extending along the duct axis, said fins being separable at a point approximately at their thickest chordwise station to form fore and aft portions, said fore portions being fixed and said aft portions being movable about the duct axis, means for moving said aft portions to a position whereby they block the gases passing through the spaces between said fore portions, and means for diverting the blocked gases transversely of the duct axis, including passages in the duct wall and means for simultaneously opening and closing said openings upon movement of said aft portions, said passages being opened when said aft portions are in the flow intercepting position and said passages being closed when said aft portions are in alignment with forward portions of said fins.

4. In a jet propulsion power plant, a combustion chamber, a duct receiving gases from said combustion chamber, a nozzle at the aft end of said duct, a central body within said duct, a plurality of fins mounted radially from said body and extending substantially to the outer wall of said duct, said fins being of airfoil shape and having their chords extending along the duct axis, said fins being separable at a point approximately at their thickest chordwise station to form fore and aft portions, said fore portions being fixed and said aft portions being movable about the duct axis, means for moving said aft portions about the duct axis to a position where they intercept the gases passing between said fore portions, passages in said aft portions for receiving said gases and turning the direction of flow, and openings in the wall of said duct communicable with said passages for emitting said gases transversely of the axis of said duct.

5. In a jet propulsion power plant, a combustion chamber, a duct receiving gases from said combustion chamber, a nozzle at the aft end of said duct, a central body within said duct, a plurality of struts mounted radially from said body and extending substantially to the outer wall of said duct, said struts being of airfoil shape and having their chords extending along the duct axis, said struts being separable at a point approximately at their thickest chordwise station to form fore and aft portions, said fore portion being fixed and said aft portions being movable about the duct axis, said strut portions in their aligned position creating a flow blockage which is approximately 50% of the cross-sectional area of said duct, means for moving said aft portions whereby they intercept the gases flowing between said fore portions thereby substantially blocking the entire duct cross-sectional area, and openings in the wall of said duct for exhausting the gases intercepted by said aft portion, including means for simultaneously opening and closing said openings upon movement of said aft portions, said openings being opened when said aft portions are in the flow intercepting position and said openings being closed when said aft portions are in alignment with forward portions of said fins.

6. In a power plant according to claim 5 wherein said aft portions are moved about the duct axis approximately $$\frac{360°}{\text{No. of struts} \times 2}$$

7. In a mechanism for reducing the forward propulsive thrust of a jet power plant, the power plant having an exhaust nozzle, a duct leading to said nozzle, streamlined fins located within the power plant upstream of said nozzle and within said duct, said fins radiating outwardly from the center of said duct and extending to the outer wall thereof, said fins including forward portions which are fixed and rearward portions arranged for simultaneous movement about the axis of said duct, said rearward portions including curved hollow passages which are normally closed, openings in said duct, and means for moving said rearward fin portions out of alignment with said forward portions whereby said curved passages are opened and intercept the gas stream flowing toward said nozzle and divert said stream, said openings being opened when said aft portions of the fins are in an intercepting position and closed when said aft portions are in alignment with respect to the forward portions of the fins.

8. In a jet propulsion power plant having an exhaust duct and a nozzle adapted to have a fluid stream flowing therethrough, a central body within said duct having a tail cone, said cone having fixed and movable portions, a plurality of fins of airfoil shape extending radially from said tail cone to a point adjacent the wall of said duct, said fins having fore and aft portions, the fore portions being fixed to the fixed portion of said tail cone and the aft portions of said fins being fixed to the movable portion of said tail cone, means for moving said movable cone portion and the aft portions of said fins about the duct axis so that said aft portions assume a position spanning the space between adjacent fore portions of said fins, curved passages within said aft fin portions for intercepting the fluid stream flowing between said fore portions, passages in the exhaust duct wall, and means for opening said passages upon movement of said fin aft portions whereby the fluid stream is diverted outwardly through the passages in said fin aft portions and the passages in said exhaust duct wall.

9. In a jet propulsion power plant, a combustion chamber, a duct receiving gases from said combustion chamber, a nozzle at the aft end of said duct, a central body within said duct, a plurality of fins mounted radially from said body and extending substantially to the outer wall of said duct, said fins being of airfoil shape and having their chords extending along the duct axis, said fins being separable at a point approximately at their thickest chordwise station to form fore and aft portions, said fore portions being fixed and said aft portions being movable about the duct axis, means for moving said aft portions about the duct axis to a position where they intercept the gases passing between said fore portions, passages in said aft portions for receiving said gases and turning the direction of flow, a shroud surrounding the outer ends of said fin aft portions and movable therewith including openings communicating with said passages, cooperating openings in the wall of said duct, the openings in said shroud and in said duct being out of registry when said fin fore and aft portions are aligned and being in registry when said portions are out of alignment.

10. In a jet propulsion power plant, a combustion chamber, a duct receiving gases from said combustion chamber, a body centrally located within said duct, a plurality of fins extending radially from said body substantially to the outer wall of said duct, said fins being of airfoil shape and having their chords extending along the duct axis, said fins having separate fore and aft portions so that they are separable at the approximate thickness chordwise station, said fore portions being fixed to one portion of said body and the duct wall, said aft portions being fixed to another portion of said body, said other portion of said body being rotatable about the duct axis whereby said aft portions of said fins are aligned with the spaces between said fore portions of said fins to intercept the flow of gases, and means for diverting the gases intercepted by said aft portions, including passages in the duct walls and means for simultaneously opening and closing said passages upon movement of said aft portions, said passages being opened when said aft portions are in the flow intercepting position and said passages being closed when said aft portions are in alignment with forward portions of said fins.

11. A jet propulsion power plant according to claim 10 wherein said aft fin portions include passages for receiving the exhaust gases and diverting them transversely of the duct axis, and means for discharging said gases.

12. In a jet propulsion device, a gas generator, a duct receiving gas from said generator and emitting said gas to provide a propulsive thrust, a plurality of members extending radially from a central portion of said duct, said members being of streamlined shape and formed in fore and aft portions, said fore portions being fixed, said aft portions being rotatable about the duct axis in unison and including means for supporting said aft portions, means for rotating said aft portions into two positions to intercept at least a portion of the gases in said duct, means for limiting the rotational movement to define said two positions, and means for directing the intercepted gases transversely of the duct axis, including passages in the duct wall and means for simultaneously opening and closing said passages upon movement of said aft portions, said passages being opened when said aft portions are in the flow intercepting position and said passages being closed when said aft portions are in alignment with forward portions of said fins.

13. In a device according to claim 12 wherein said means for rotating includes a selectively controlled power means and said limiting means comprises a pair of stops movable with said aft portions and a cooperating stop engaging member fixed with respect to said fore portions.

References Cited in the file of this patent

UNITED STATES PATENTS

| | | |
|---|---|---|
| 1,986,252 | Conran | Jan. 1, 1935 |
| 2,612,747 | Skinner | Oct. 7, 1952 |
| 2,648,353 | Haworth | Aug. 11, 1953 |

FOREIGN PATENTS

| | | |
|---|---|---|
| 477,771 | Canada | Oct. 16, 1951 |
| 860,754 | Germany | Dec. 22, 1952 |